United States Patent [19]

Fujioka et al.

[11] 4,372,654
[45] Feb. 8, 1983

[54] TELEPHOTO ZOOM LENS

[75] Inventors: Yoshisato Fujioka, Higashikurume; Atsushi Kawamura, Yokosuka, both of Japan

[73] Assignee: Ricoh Company, Ltd., Tokyo, Japan

[21] Appl. No.: 262,652

[22] Filed: May 11, 1981

[30] Foreign Application Priority Data

May 15, 1980 [JP] Japan ................................ 55-64636

[51] Int. Cl.³ ........................................... G02B 15/16
[52] U.S. Cl. ..................................................... 350/427
[58] Field of Search ........................................ 350/427

[56] References Cited

U.S. PATENT DOCUMENTS 4,094,586  6/1978  Sato et al. ........................ 350/427
4,105,291  8/1978  Tsuji ................................... 350/427

FOREIGN PATENT DOCUMENTS 2650551  12/1977  Fed. Rep. of Germany ...... 350/427
52-56947  5/1977  Japan ................................. 350/427

*Primary Examiner*—John K. Corbin
*Assistant Examiner*—Scott J. Sugarman
*Attorney, Agent, or Firm*—Guy W. Shoup; Eliot S. Gerber

[57] ABSTRACT

A telephoto zoom lens comprises a first, a second, a third and a fourth group which are sequentially disposed beginning from an object side. The first group is a focusing lens group and remains stationary during a zooming operation, but is movable during a focusing operation and as a whole has a positive refractive power. The second group is a variator lens group and generally has a negative refractive power. The second group moves along the optical axis during a zooming operation, and is principally used for converting the focal length. The third group is a compensator lens group which generally has a positive refractive power and which moves along the optical axis during a zooming operation to maintain an image plane at a given location as it varies with a movement of the second group. The fourth group is a relay lens system which remains stationary during a focusing or a zooming operation.

4 Claims, 6 Drawing Figures

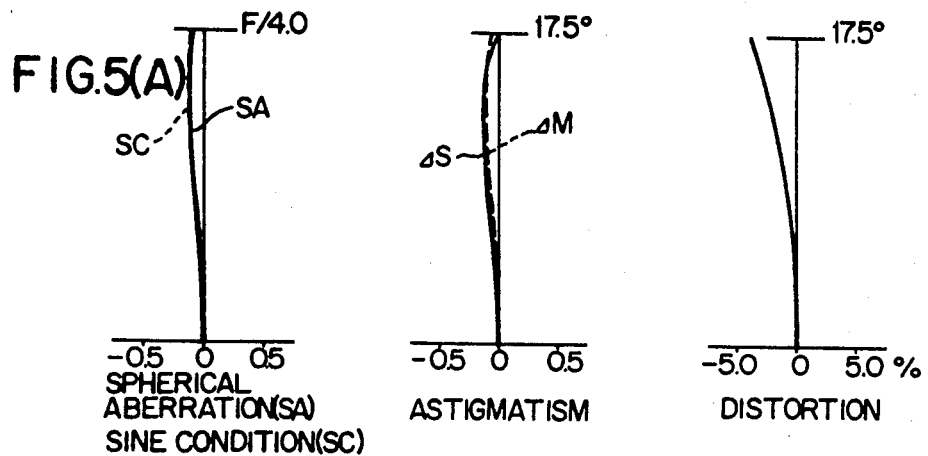
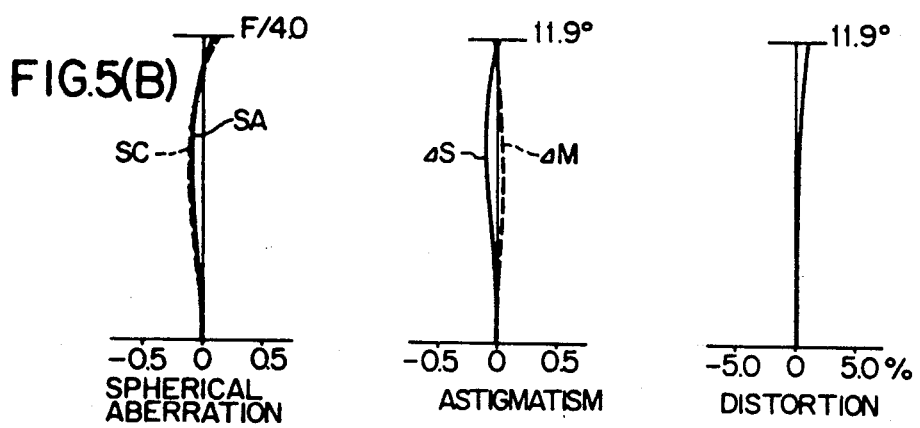
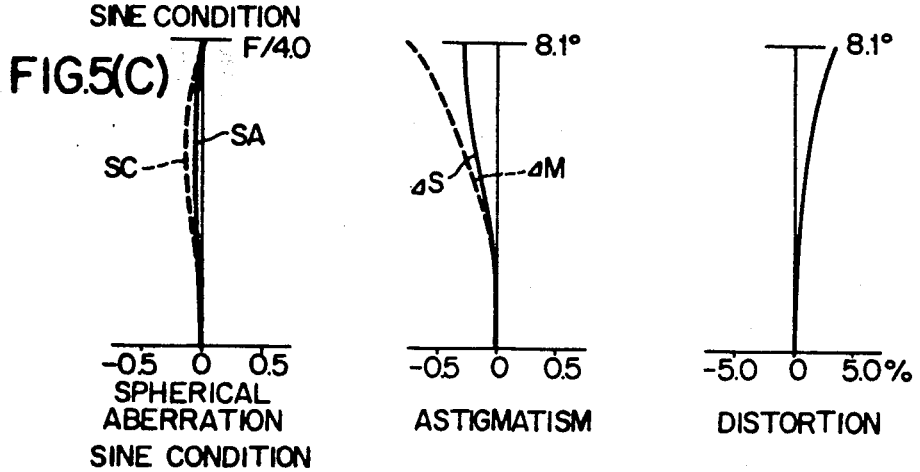

FIG.6(A)
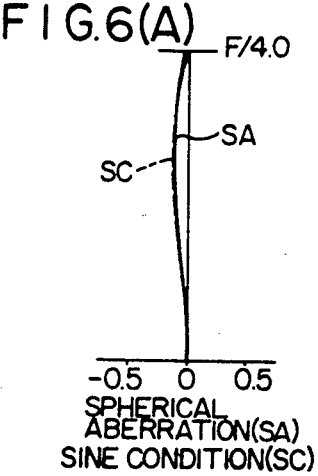
SPHERICAL ABERRATION(SA)
SINE CONDITION(SC)
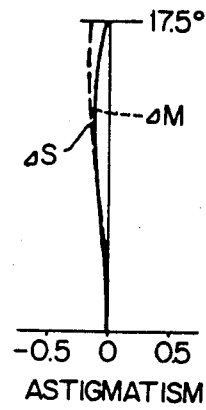
ASTIGMATISM
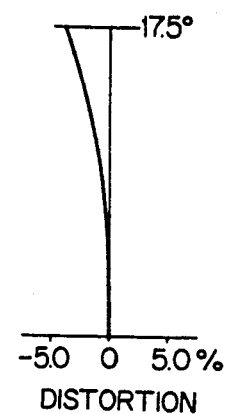
DISTORTION
FIG.6(B)
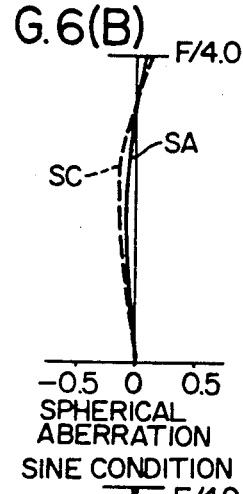
SPHERICAL ABERRATION
SINE CONDITION
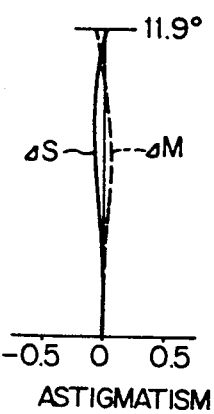
ASTIGMATISM
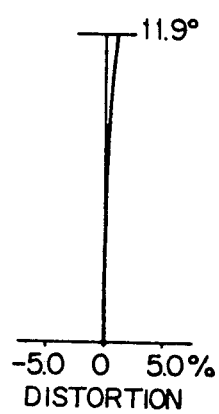
DISTORTION
FIG.6(C)
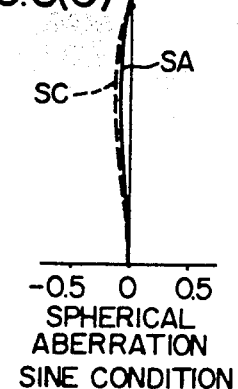
SPHERICAL ABERRATION
SINE CONDITION
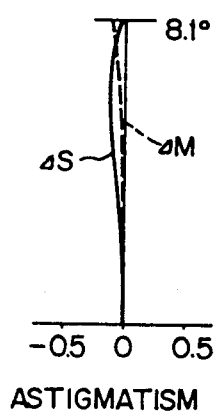
ASTIGMATISM
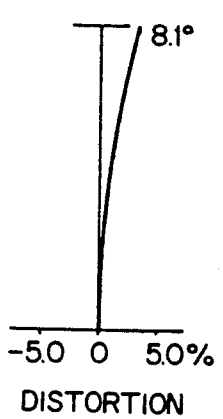
DISTORTION

TELEPHOTO ZOOM LENS

BACKGROUND OF THE INVENTION

The invention relates to a telephoto zoom lens for 35-mm still camera.

Heretofore, there has been proposed a zoom lens of so-called mechanical correction type comprising a variable magnification system formed by three groups having a positive, a negative and a positive refractive power, respectively, and a relay lens system and in which as the focal length is changed by a movement of the second group along the optical axis during a zooming operation, the third group is moved to correct for a variation in the location of an image plane which is attributable to the movement of the second group.

A high maneuverability is generally required when using a zoom lens of this type, but the available construction is not suitable for portable use in consideration of its weight and size. While various efforts have been made in designing a compact and light zoom lens, by reducing the overall length and reducing the diameter of the front lenses while maintaining a sufficient brightness of the edge of the image field, a variety of difficulties have been encountered with.

In the design of a compact zoom lens, the determination of a distribution of the power among the individual groups is of primary importance. Any lens configuration cannot achieve a satisfactory result without a proper distribution of the power.

To reduce the overall length of the lens, it is essential that the variable magnification system be constructed in a compact manner and that the relay lens system be of a telephoto type.

It is established that it is most effective to assign high powers to the various groups in the variable magnification system while imparting a higher refractive power to the second or the variator lens group to reduce the stroke of movement thereof in order to reduce the size of the variable magnification system. In this instance, the individual surfaces in the second group are obviously given high powers, which must be limited, however, for purpose of correcting the aberrations.

On the other hand, when the relay lens system is formed as a telephoto type, there is a tendency toward a reduced magnitude of the telephoto ratio and a reduced value of Petzval sum. Accordingly, the number of individual lenses must be increased to provide a sufficient correction of a negative Petzval sum which occurs in the variable magnification system. This resulted in a complex and heavy lens arrangement if it is attempted to provide a compact zoom lens by reducing the overall length thereof.

SUMMARY OF THE INVENTION

It is an object of the invention to provide a telephoto zoom lens in which the individual groups of the variable magnification system are given a proper distribution of powers, thus providing a compact arrangement with a favorable correction of aberrations while utilizing a simplified relay lens system.

A telephoto zoom lens according to the invention consists of four groups, in which a first, a second, and a third group form together a variable magnification system while a fourth group forms a relay lens system.

The first group comprises a composite converging lens system formed by a combination of a negative and a positive or a positive and a negative single lens, and a positive single lens, which are sequentially disposed as viewed from the object side. The first group does not move during a zoom operation, but moves only during a focusing operation. Thus, the first group represents a focusing lens group, and has the function of making the lens arrangement achromatic.

The second group which is disposed on the image side of the first group comprises a negative lens, formed by a positive and a negative lens joined together in this sequence, and a negative single lens disposed on the image side of the first mentioned negative lens. The second group moves along the optical axis during a zooming operation, and principally serves converting the focal length. Thus, the second group represents a variator lens group.

The third group comprises a positive lens formed by a negative and a positive lens joined together. The third group is disposed on the image side of the second group and moves along the optical axis in synchronized relationship with the movement of the second group, correcting for a shift of an image field which is attributable to the movement of the second group so as to maintain the image plane at a given location. Thus, the third group represents a compensator lens group.

As the second group moves along the optical axis from the end, located on the object side, of a region in which it is movable, the third group initially moves along the optical axis toward the image side, but such movement ceases at a given point, whereupon the third group reverses and begins to move toward the object side as the second group continues to move toward the image side. The reverse is true for the movement of the third group as the second group moves from the image side toward the object side.

As mentioned previously, the first, the second and the third group form a variable magnification system together.

The fourth group, serving as a relay lens system and diposed on the image side of the variable magnification system, comprises a pair of positive lenses having their surfaces of high curvature directed toward the object side, a negative lens having its surface of high curvature directed toward the image side, a positive convex single lens, and a negative lens having its surface of a high curvature directed toward the object side, all of which are sequentially disposed in the sequence named as viewed from the object side. The fourth group does not move during a zooming operation and a focusing operation.

In the described arrangement of the telephoto zoom lens according to the invention, the individual lenses satisfy the following requirements:

$$0.8 < \frac{f_1}{f_4} < 1.5 \tag{1}$$

$$0.8 < \left|\frac{r_8}{r_9}\right| < 1.5 \tag{2}$$

$$0.7 < \frac{r_{12}}{n_7 - n_8} \cdot \frac{1}{f_3} < 3 \tag{3}$$

$$0.1 < \frac{r_{19}}{f_4} < 0.5 \tag{4}$$

$$1 < \frac{r_{21}}{r_{22}} < 2 \tag{5}$$

-continued $$n_9 < 1.68, \nu_9 > 50 \qquad (6)$$
$$n_{10} < 1.68, \nu_{10} > 50$$

wherein $f_i$ represents the composite focal length of an i-th group, $r_i$ the radius of curvature of an i-th surface, $d_i$ the axial thickness or air separation between an i-th and an (i+1)-th surface, $n_i$ the refractive index of an i-th lens with respect to the d-line of the spectrum, and $\nu_i$ the Abbe's number of an i-th lens.

The requirement (1) defines the distribution of powers among the groups, in particular, a balance between the variable magnification system and the relay lens system. Where the lower limit is exceeded, the variable magnification system will become too small to render the correction of aberrations difficult, thus failing to meet the practical use. Conversely, when the upper limit is exceeded, the overall length increases even though the correction of aberrations is facilitated. In addition, a forward projection of lens during a focusing operation increases, thus increasing the diameter of front lenses and failing to meet the maneuverability requirement.

The requirement (2) determines an air lens in the second group in consideration of aberrations to be corrected, and is important in suppressing variations in the aberrations, in particular, during a zooming operation. If the lower limit is exceeded, the bottom portion of the image plane will be considerably bent toward the lens toward the shorter end of the focal length, degrading the balance of the image plane when the magnification is changed. If the upper limit is exceeded, the distortion will increase in the negative sense toward the shorter end of the focal length, and if it is attempted to compensate it for by means of other parameters, an overall balance of aberrations cannot be reached.

The requirement (3) causes a higher order aberration to occur across the joined surface in the third group, thereby correcting the aberrations of the entire system. If the lower limit is exceeded, spherical aberration will be excessive and it becomes impossible to form a campact third group because of edge thickness which is required for machining a convex lens. If the upper limit is exceeded, the spherical aberration will be undercorrected, making it difficult to correct higher order terms.

The requirement (4) is necessary to provide a correction of aberrations while maintaining a good telephoto ratio of the relay lens system. If $r_{19}$ becomes less than the lower limit, rays which pass through the edge portion of the lens will produce coma flare at a median angle of view, causing a degraded performance. If the upper limit is exceeded, a reduction in the telephoto ratio becomes ineffective, and a compact relay lens system cannot be implemented.

The requirement (5) represents the major fueature of the invention. In the prior art practice, there is a telephoto zoom lens which utilizes a relay lens system of Ernostar type and in which a positive lens which is located rearmost is divided into a positive and a negative lens so that the diameter of the rear lens can be reduced and the back focus may be reduced, thereby providing a high performance while improving the telephoto ratio. The purpose of the requirement (5) is to determine an air lens to be formed between the positive and the negative lens in consideration of aberrations to be corrected. If the lower limit is exceeded, the spherical aberration will be undercorrected and increases while the spherical aberration will be excessive if the upper limit is exceeded.

The requirement (6) is imposed on the relay lens system in order to correct the Petzval sum which tends to be excessively small. If the refractive index exceeds the upper limit, the Petzval sum will be too small or become negative, making it difficult to provide a satisfactory correction of astigmatism in the meridional direction. In addition, a restriction is imposed on the Abbe's number in order to minimize the chromatic aberration which is produced when the telephoto ratio is suppressed to a small value.

BRIEF DESCRIPTION OF THE DRAWINGS

FIGS. 4 to 6 graphically illustrate various aberrations relating to the embodiments shown in FIGS. 1 to 3, respectively.

DESCRIPTION OF PREFERRED EMBODIMENTS

Three embodiments of the invention will be described below in which it is assumed that the composite focal length f of the zoom lens varies in a region defined by inequalities $71.4 \leq f \leq 147$ and F/4.0.

Figure 1:
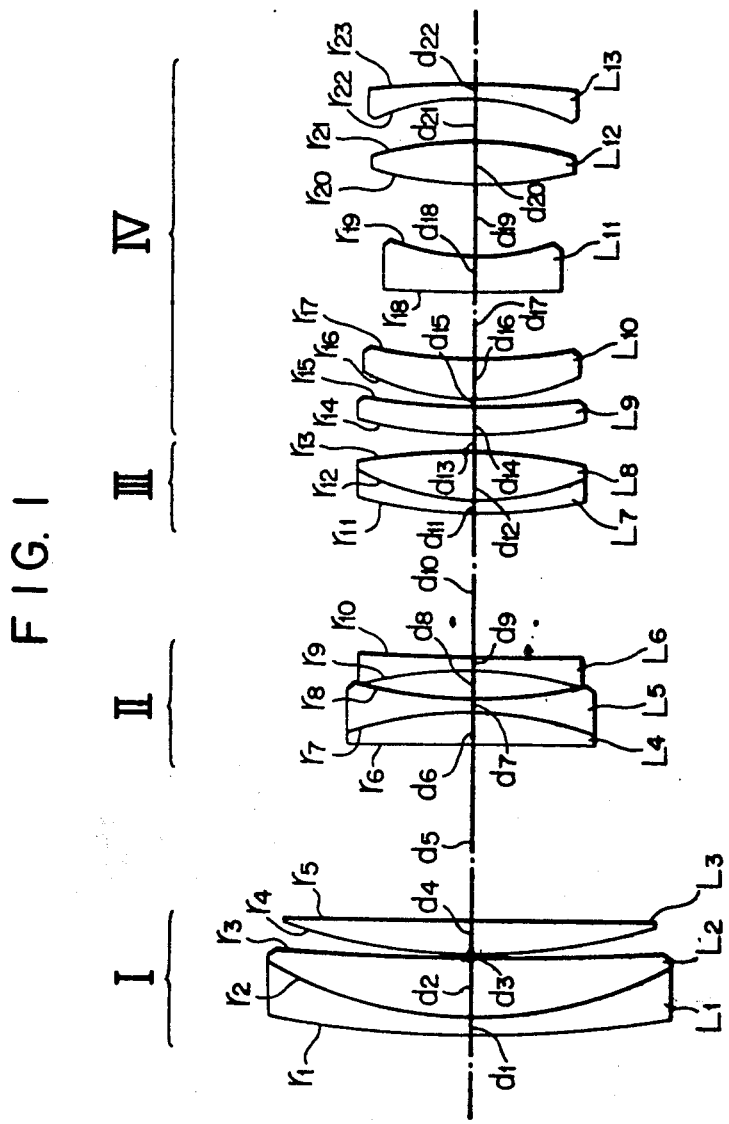
FIG. 1 is a schematic view illustrating an optical arrangement according to a first embodiment of the invention.
Figure 2:
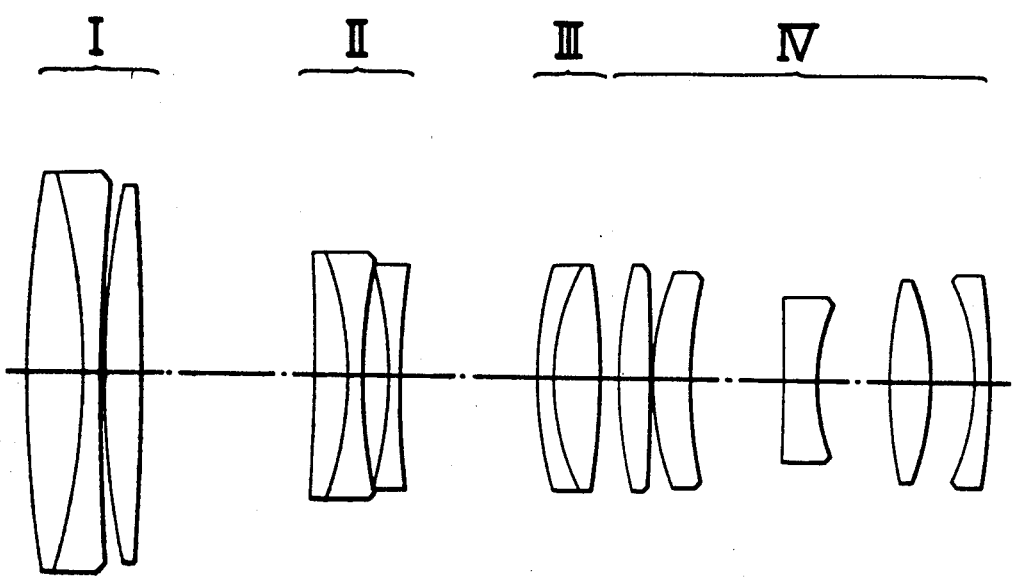
FIG. 2 is a schematic view illustrating an optical arrangement according to another embodiment of the invention.
Figure 3:
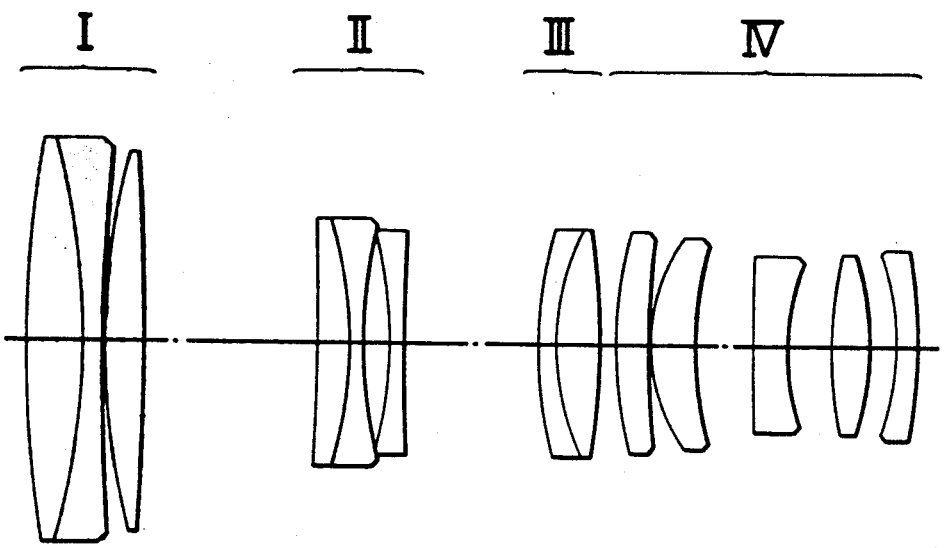
FIG. 3 is a schematic view illustrating an optical arrangement according to a further embodiment of the invention.

FIG. 1 shows the configuration of a first embodiment, in which characters I, II, III and IV represent a first, a second, a third, and a fourth group, respectively. In FIGS. 2 and 3 which illustrate a second and a third embodiment, respectively, these characters I to IV also represent the first to the fourth group, respectively. Characters $r_1$ to $R_{23}$ represent the radius of curvature of individual lens surfaces while characters $d_1$ to $d_{22}$ represent the axial separation between adjacent lens surfaces as is well known in the art. To avoid complexity, these characters $r_i$ and $d_i$ are omitted in FIGS. 2 and 3. In FIG. 1, characters $L_1$ to $L_{13}$ represent individual lenses, and an i-th lens is indicated by a denotation $L_i$. The designation of such characters is also omitted in FIGS. 2 and 3.

| Embodiment 1 (FIG. 1) | | | |
|---|---|---|---|
| $71.4 \leq f \leq 147$, F/4.0 | | | |
| $f_1 = 100$, | $f_3 = 85$, | $f_4 = 94.274$ | |
| $r_1 = 141.195$ | | | |
| | $d_1 = 2.00$ | $n_1 = 1.67270$ | $\nu_1 = 32.17$ |
| $r_2 = 45.578$ | | | |
| | $d_2 = 6.50$ | $n_2 = 1.61272$ | $\nu_2 = 58.58$ |
| $r_3 = 287.848$ | | | |
| | $d_3 = 0.10$ | | |
| $r_4 = 71.713$ | | | |
| | $d_4 = 4.00$ | $n_3 = 1.58913$ | $\nu_3 = 61.25$ |
| $r_5 = -974.528$ | | | |
| | $d_5 = $ variable | | |
| $r_6 = -776.784$ | | | |
| | $d_6 = 3.80$ | $n_4 = 1.78472$ | $\nu_4 = 25.70$ |
| $r_7 = -39.912$ | | | |
| | $d_7 = 1.50$ | $n_5 = 1.69680$ | $\nu_5 = 55.46$ |
| $r_8 = 59.749$ | | | |
| | $d_8 = 2.88$ | | |
| $r_9 = -50.859$ | | | |
| | $d_9 = 1.50$ | $n_6 = 1.69680$ | $\nu_6 = 55.46$ |

-continued

Embodiment 1 (FIG. 1)

| | | | |
|---|---|---|---|
| $r_{10} = 165.681$ | $d_{10}$ = variable | | |
| $r_{11} = 52.618$ | $d_{11} = 1.50$ | $n_7 = 1.67270$ | $v_7 = 32.17$ |
| $r_{12} = 25.730$ | $d_{12} = 5.20$ | $n_8 = 1.51823$ | $v_8 = 58.96$ |
| $r_{13} = -101.761$ | $d_{13}$ = variable | | |
| $r_{14} = 42.825$ | $d_{14} = 3.80$ | $n_9 = 1.51633$ | $v_9 = 64.15$ |
| $r_{15} = 256.174$ | $d_{15} = 0.10$ | | |
| $r_{16} = 26.650$ | $d_{16} = 4.30$ | $n_{10} = 1.51633$ | $v_{10} = 64.15$ |
| $r_{17} = 47.901$ | $d_{17} = 7.48$ | | |
| $r_{18} = 267.210$ | $d_{18} = 3.56$ | $n_{11} = 1.75520$ | $v_{11} = 27.56$ |
| $r_{19} = 24.809$ | $d_{19} = 8.10$ | | |
| $r_{20} = 41.372$ | $d_{20} = 4.84$ | $n_{12} = 1.60717$ | $v_{12} = 40.36$ |
| $r_{21} = -32.367$ | $d_{21} = 4.61$ | | |
| $r_{22} = -24.809$ | $d_{22} = 1.50$ | $n_{13} = 1.63854$ | $v_{13} = 55.46$ |
| $r_{23} = -162.783$ | | | |

| | Variable Separation | | |
|---|---|---|---|
| f | 71.400 | 102.449 | 147.000 |
| $d_5$ | 2.836 | 19.050 | 30.350 |
| $d_{10}$ | 25.140 | 15.498 | 1.664 |
| $d_{13}$ | 8.785 | 2.213 | 4.747 |

Embodiment 2 (FIG. 2)

$71.4 \leq f \leq 147, F/4.0$
$f_1 = 100, \quad f_3 = 85, \quad f_4 = 94.274$

| | | | |
|---|---|---|---|
| $r_1 = 135.746$ | $d_1 = 6.30$ | $n_1 = 1.61272$ | $v_1 = 58.58$ |
| $r_2 = -76.800$ | $d_2 = 2.20$ | $n_2 = 1.67270$ | $v_2 = 32.17$ |
| $r_3 = 500.000$ | $d_3 = 0.10$ | | |
| $r_4 = 87.155$ | $d_4 = 4.00$ | $n_3 = 1.58913$ | $v_3 = 61.25$ |
| $r_5 = -583.829$ | $d_5$ = variable | | |
| $r_6 = -776.784$ | $d_6 = 3.80$ | $n_4 = 1.78472$ | $v_4 = 25.70$ |
| $r_7 = -39.912$ | $d_7 = 1.50$ | $n_5 = 1.69680$ | $v_5 = 55.46$ |
| $r_8 = 59.749$ | $d_8 = 2.88$ | | |
| $r_9 = -50.859$ | $d_9 = 1.50$ | $n_6 = 1.69680$ | $v_6 = 55.46$ |
| $r_{10} = 165.681$ | $d_{10}$ = variable | | |
| $r_{11} = 52.618$ | $d_{11} = 1.50$ | $n_7 = 1.67270$ | $v_7 = 32.17$ |
| $r_{12} = 25.730$ | $d_{12} = 5.20$ | $n_8 = 1.51823$ | $v_8 = 58.96$ |
| $r_{13} = -101.761$ | $d_{13}$ = variable | | |
| $r_{14} = 48.107$ | $d_{14} = 3.80$ | $n_9 = 1.51633$ | $v_9 = 64.15$ |
| $r_{15} = -509.683$ | $d_{15} = 0.10$ | | |
| $r_{16} = 29.336$ | $d_{16} = 4.30$ | $n_{10} = 1.51633$ | $v_{10} = 64.15$ |
| $r_{17} = 46.202$ | $d_{17} = 10.39$ | | |
| $r_{18} = -267.210$ | $d_{18} = 3.56$ | $n_{11} = 1.75520$ | $v_{11} = 27.53$ |
| $r_{19} = 27.163$ | $d_{19} = 7.74$ | | |
| $r_{20} = 42.629$ | $d_{20} = 4.84$ | $n_{12} = 1.60717$ | $v_{12} = 40.36$ |
| $r_{21} = -29.086$ | $d_{21} = 4.65$ | | |
| $r_{22} = -23.705$ | $d_{22} = 1.50$ | $n_{13} = 1.63854$ | $v_{13} = 55.46$ |
| $r_{23} = -93.340$ | | | |

| | Variable Separation | | |
|---|---|---|---|
| f | 71.40 | 102.449 | 147.0 |
| $d_5$ | 2.629 | 18.843 | 30.143 |
| $d_{10}$ | 25.140 | 15.498 | 1.664 |
| $d_{13}$ | 8.796 | 2.224 | 4.758 |

Embodiment 3 (FIG. 3)

$71.4 \leq f \leq 147, F/4.0$
$f_1 = 100, \quad f_3 = 85, \quad f_4 = 94.274$

| | | | |
|---|---|---|---|
| $r_1 = 139.073$ | $d_1 = 6.30$ | $n_1 = 1.61272$ | $v_1 = 58.58$ |
| $r_2 = -76.188$ | $d_2 = 2.20$ | $n_2 = 1.67270$ | $v_2 = 32.17$ |
| $r_3 = 521.120$ | $d_3 = 0.10$ | | |
| $r_4 = 85.191$ | $d_4 = 4.00$ | $n_3 = 1.58913$ | $v_3 = 61.25$ |
| $r_5 = -647.477$ | $d_5$ = variable | | |
| $r_6 = -1347.387$ | $d_6 = 3.80$ | $n_4 = 1.78472$ | $v_4 = 25.7$ |
| $r_7 = -41.465$ | $d_7 = 1.50$ | $n_5 = 1.69680$ | $v_5 = 55.46$ |
| $r_8 = 57.285$ | $d_8 = 2.88$ | | |
| $r_9 = -50.391$ | $d_9 = 1.50$ | $n_6 = 1.69680$ | $v_6 = 55.46$ |
| $r_{10} = 176.105$ | $d_{10}$ = variable | | |
| $r_{11} = 51.821$ | $d_{11} = 1.50$ | $n_7 = 1.67270$ | $v_7 = 32.17$ |
| $r_{12} = 24.940$ | $d_{12} = 5.20$ | $n_8 = 1.51823$ | $v_8 = 58.96$ |
| $r_{13} = -101.940$ | $d_{13}$ = variable | | |
| $r_{14} = 48.054$ | $d_{14} = 3.80$ | $n_9 = 1.51633$ | $v_9 = 64.15$ |
| $r_{15} = 156.159$ | $d_{15} = 0.10$ | | |
| $r_{16} = 19.664$ | $d_{16} = 4.30$ | $n_{10} = 1.51633$ | $v_{10} = 64.15$ |
| $r_{17} = 31.396$ | $d_{17} = 6.47$ | | |
| $r_{18} = 154.692$ | $d_{18} = 3.56$ | $n_{11} = 1.75520$ | $v_{11} = 27.53$ |
| $r_{19} = 21.920$ | $d_{19} = 4.88$ | | |
| $r_{20} = 31.084$ | $d_{20} = 4.84$ | $n_{12} = 1.60717$ | $v_{12} = 40.36$ |
| $r_{21} = -27.453$ | $d_{21} = 3.08$ | | |
| $r_{22} = -19.659$ | $d_{22} = 1.50$ | $n_{13} = 1.63854$ | $v_{13} = 55.46$ |
| $r_{23} = -121.730$ | | | |

| | Variable Separation | | |
|---|---|---|---|
| f | 7.14 | 102.449 | 147.0 |
| $d_5$ | 2.635 | 18.849 | 30.149 |
| $d_{10}$ | 25.177 | 15.535 | 1.701 |
| $d_{13}$ | 8.785 | 2.213 | 4.747 |

Figure 4A:
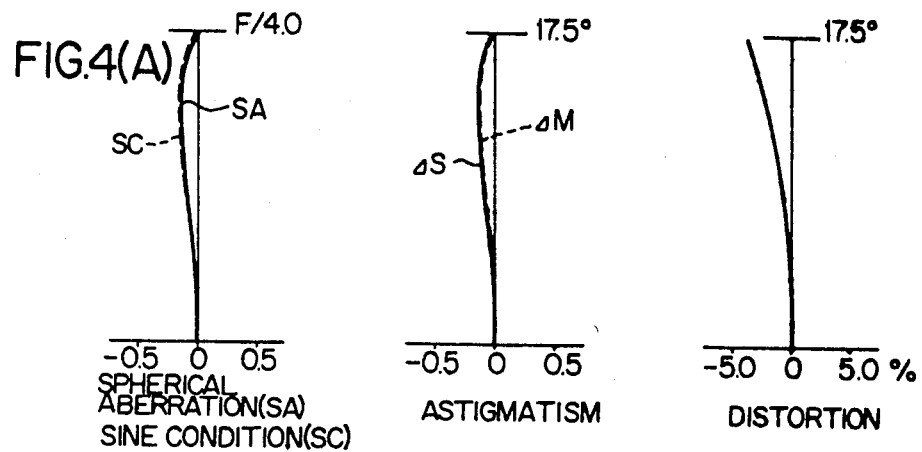
Figure 4B:
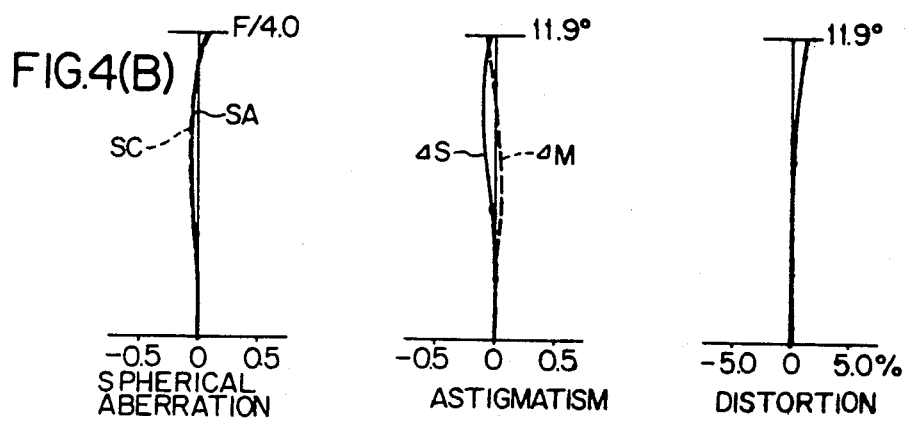
Figure 4C:
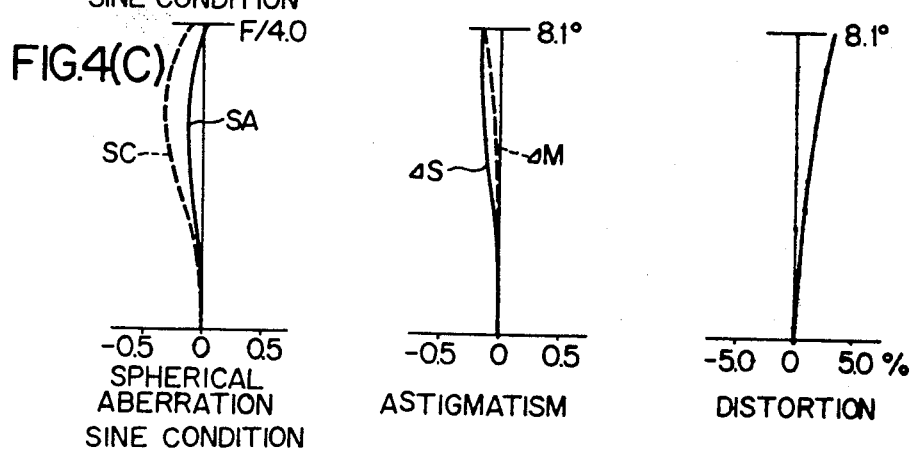

Aberrations relating to the first embodiment are graphically shown in FIG. 4, aberrations relating to the second embodiment are graphically shown in FIG. 5, and aberrations relating to the third embodiment are graphically shown in FIG. 6. In FIGS. 4 to 6, curves A correspond to f=71.4, B to f=102.449, and C to f=147.

$\Delta M$ represents the meridional focal line and $\Delta S$ the sagittal focal line. As shown, the aberrations are favorably corrected in each embodiment throughout the full range of the focal length.

What is claimed is:

1. A telephoto zoom lens comprising a variable magnification system including a first group which does not move during a zooming operation, but moves only during a focussing operation and generally having a positive refractive power and serving as a focussing group, a second group generally having a negative refractive power to serve as a variator lens group and disposed for movement along an optical axis during a zooming operation, the second group principally utilized to convert a focal length, and a third group generally having a positive refractive power to serve as a compensator lens group, the third group being disposed for movement along the optical axis during a zooming operation to maintain an image plane at a given location as the latter tends to shift with the movement of the second group, the first to the third groups being sequentially disposed in the sequence named as viewed from an object side, and a relay lens system formed by a fourth group which is disposed on an image side of the variable magnification system and which remains stationary during a focussing and a zooming operation; the first group including a composite converging lens system, formed by a combination of a negative and a positive or a positive and a negative single lens, and a positive single lens, all disposed in the sequence named as viewed from the object side, the second group including a negative lens, formed by a positive and a negative lens joined together, and a negative single lens, all disposed in the sequence named as viewed from the object side, the third group including a positive lens formed by a negative and a positive lens joined together, and the fourth group including a pair of positive lenses having their surfaces of high curvature directed toward the object side, a negative lens having its surface of a high curvature directed toward the image side, a positive single lens, and a negative lens having its surface of high curvature directed toward the object side, all disposed in the sequence named as viewed from the object side toward the image side, and wherein the individual lenses satisfy the following requirements:

$$0.8 < \frac{f_1}{f_4} < 1.5 \quad (1)$$

$$0.8 < \left|\frac{r_8}{r_9}\right| < 1.5 \quad (2)$$

$$0.7 < \frac{r_{12}}{n_7 - n_8} \cdot \frac{1}{f_3} < 3 \quad (3)$$

$$0.1 < \frac{r_{19}}{f_4} < 0.5 \quad (4)$$

$$1 < \frac{r_{21}}{r_{22}} < 2 \quad (5)$$

$$n_9 < 1.68, \gamma_9 > 50 \quad (6)$$
$$n_{10} < 1.68, \gamma_{10} > 50$$

where $f_i$ represents the composite focal length of an i-th group, $r_i$ the radius of curvature of an i-th surface, $d_i$ the axial thickness or air separation between an i-th and an (i+1)-th surface, $n_i$ the refractive index of an i-th lens with respect to d-line of the spectrum and $\nu_i$ the Abbe's number of an i-th lens.

2. A telephoto zoom lens according to claim 1 in which representing the composite focal length of the telephoto zoom lens by f, the various parameters are defined as follows:

| $71.4 \leq f \leq 147$ F/4.0 | | | |
|---|---|---|---|
| $f_1 = 100$ $f_3 = 85$ $f_4 = 94.274$ | | | |
| $r_1 = 141.195$ | | | |
| | $d_1 = 2.00$ | $n_1 = 1.67270$ | $\nu_1 = 32.17$ |
| $r_2 = 45.578$ | | | |
| | $d_2 = 6.50$ | $n_2 = 1.61272$ | $\nu_2 = 58.58$ |
| $r_3 = 287.848$ | | | |
| | $d_3 = 0.10$ | | |
| $r_4 = 71.713$ | | | |
| | $d_4 = 4.00$ | $n_3 = 1.58913$ | $\nu_3 = 61.25$ |
| $r_5 = -974.528$ | | | |
| | $d_5 =$ variable | | |
| $r_6 = -776.784$ | | | |
| | $d_6 = 3.80$ | $n_4 = 1.78472$ | $\nu_4 = 25.70$ |
| $r_7 = -39.912$ | | | |
| | $d_7 = 1.50$ | $n_5 = 1.69680$ | $\nu_5 = 55.46$ |
| $r_8 = 59.749$ | | | |
| | $d_8 = 2.88$ | | |
| $r_9 = -50.859$ | | | |
| | $d_9 = 1.50$ | $n_6 = 1.69680$ | $\nu_6 = 55.46$ |
| $r_{10} = 165.681$ | | | |
| | $d_{10} =$ variable | | |
| $r_{11} = 52.618$ | | | |
| | $d_{11} = 1.50$ | $n_7 = 1.67270$ | $\nu_7 = 32.17$ |
| $r_{12} = 25.730$ | | | |
| | $d_{12} = 5.20$ | $n_8 = 1.51823$ | $\nu_8 = 58.96$ |
| $r_{13} = -101.761$ | | | |
| | $d_{13} =$ variable | | |
| $r_{14} = 42.825$ | | | |
| | $d_{14} = 3.80$ | $n_9 = 1.51633$ | $\nu_9 = 64.15$ |
| $r_{15} = 256.174$ | | | |
| | $d_{15} = 0.10$ | | |
| $r_{16} = 26.650$ | | | |
| | $d_{16} = 4.30$ | $n_{10} = 1.51633$ | $\nu_{10} = 64.15$ |
| $r_{17} = 47.901$ | | | |
| | $d_{17} = 7.48$ | | |
| $r_{18} = 267.210$ | | | |
| | $d_{18} = 3.56$ | $n_{11} = 1.75520$ | $\nu_{11} = 27.56$ |
| $r_{19} = 24.809$ | | | |
| | $d_{19} = 8.10$ | | |
| $r_{20} = 41.372$ | | | |
| | $d_{20} = 4.84$ | $n_{12} = 1.60717$ | $\nu_{12} = 40.36$ |
| $r_{21} = -32.367$ | | | |
| | $d_{21} = 4.61$ | | |
| $r_{22} = -24.809$ | | | |
| | $d_{22} = 1.50$ | $n_{13} = 1.63854$ | $\nu_{13} = 55.46$ |
| $r_{23} = -162.783$ | | | | and variable separations are defined as follows:

| f | 71.400 | 102.449 | 147.000 |
|---|---|---|---|
| $d_5$ | 2.836 | 19.050 | 30.350 |
| $d_{10}$ | 25.140 | 15.498 | 1.664 |
| $d_{13}$ | 8.785 | 2.213 | 4.747 |

3. A telephoto zoom lens according to claim 1 in which representing the composite focal length of the telephoto zoom lens by f, the various parameters are defined as follows:

| $71.4 \leq f \leq 147$ F/4.0 | | | |
|---|---|---|---|
| $f_1 = 100,$ $f_3 = 85,$ $f_4 = 94.274$ | | | |
| $r_1 = 135.746$ | | | |
| | $d_1 = 6.30$ | $n_1 = 1.61272$ | $\nu_1 = 58.58$ |
| $r_2 = -76.800$ | | | |
| | $d_2 = 2.20$ | $n_2 = 1.67270$ | $\nu_2 = 32.17$ |
| $r_3 = 500.000$ | | | |
| | $d_3 = 0.10$ | | |

-continued

| $71.4 \leq f \leq 147$ F/4.0 $f_1 = 100, \quad f_3 = 85, \quad f_4 = 94.274$ |||||
|---|---|---|---|---|
| $r_4 = 87.155$ | | | | |
| | $d_4 = 4.00$ | | $n_3 = 1.58913$ | $\nu_3 = 61.25$ |
| $r_5 = -583.829$ | | | | |
| | $d_5 = $ variable | | | |
| $r_6 = -776.784$ | | | | |
| | $d_6 = 3.80$ | | $n_4 = 1.78472$ | $\nu_4 = 25.70$ |
| $r_7 = -39.912$ | | | | |
| | $d_7 = 1.50$ | | $n_5 = 1.69680$ | $\nu_5 = 55.46$ |
| $r_8 = 59.749$ | | | | |
| | $d_8 = 2.88$ | | | |
| $r_9 = -50.859$ | | | | |
| | $d_9 = 1.50$ | | $n_6 = 1.69680$ | $\nu_6 = 55.46$ |
| $r_{10} = 165.681$ | | | | |
| | $d_{10} = $ variable | | | |
| $r_{11} = 52.618$ | | | | |
| | $d_{11} = 1.50$ | | $n_7 = 1.67270$ | $\nu_7 = 32.17$ |
| $r_{12} = 25.730$ | | | | |
| | $d_{12} = 5.20$ | | $n_8 = 1.51823$ | $\nu_8 = 58.96$ |
| $r_{13} = -101.761$ | | | | |
| | $d_{13} = $ variable | | | |
| $r_{14} = 48.107$ | | | | |
| | $d_{14} = 3.80$ | | $n_9 = 1.51633$ | $\nu_9 = 64.15$ |
| $r_{15} = -509.683$ | | | | |
| | $d_{15} = 0.10$ | | | |
| $r_{16} = 29.336$ | | | | |
| | $d_{16} = 4.30$ | | $n_{10} = 1.51633$ | $\nu_{10} = 64.15$ |
| $r_{17} = 46.202$ | | | | |
| | $d_{17} = 10.39$ | | | |
| $r_{18} = -267.210$ | | | | |
| | $d_{18} = 3.56$ | | $n_{11} = 1.75520$ | $\nu_{11} = 27.53$ |
| $r_{19} = 27.163$ | | | | |
| | $d_{19} = 7.74$ | | | |
| $r_{20} = 42.629$ | | | | |
| | $d_{20} = 4.84$ | | $n_{12} = 1.60717$ | $\nu_{12} = 40.36$ |
| $r_{21} = -29.086$ | | | | |
| | $d_{21} = 4.65$ | | | |
| $r_{22} = -23.705$ | | | | |
| | $d_{22} = 1.50$ | | $n_{13} = 1.63854$ | $\nu_{13} = 55.46$ |
| $r_{23} = -93.340$ | | | | | and variable separations are defined as follows:

| f | 71.40 | 102.449 | 147.0 |
|---|---|---|---|
| $d_5$ | 2.629 | 18.843 | 30.143 |
| $d_{10}$ | 25.140 | 15.498 | 1.664 |
| $d_{13}$ | 8.796 | 2.224 | 4.758 |

4. A telephoto zoom lens according to claim 1 in which representing the composite focal length of the telephoto zoom lens by f, the various parameters are defined as follows:

| $71.4 \leq f \leq 147$ F/4.0 $f_1 = 100, \quad f_3 = 85, \quad f_4 = 94.274$ |||||
|---|---|---|---|---|
| $r_1 = 139.073$ | | | | |
| | $d_1 = 6.30$ | | $n_1 = 1.61272$ | $\nu_1 = 58.58$ |
| $r_2 = -76.188$ | | | | |
| | $d_2 = 2.20$ | | $n_2 = 1.67270$ | $\nu_2 = 32.17$ |
| $r_3 = 521.120$ | | | | |
| | $d_3 = 0.10$ | | | |
| $r_4 = 85.191$ | | | | |
| | $d_4 = 4.00$ | | $n_3 = 1.58913$ | $\nu_3 = 61.25$ |
| $r_5 = -647.477$ | | | | |
| | $d_5 = $ variable | | | |
| $r_6 = -1347.387$ | | | | |
| | $d_6 = 3.80$ | | $n_4 = 1.78472$ | $\nu_4 = 25.7$ |
| $r_7 = -41.465$ | | | | |
| | $d_7 = 1.50$ | | $n_5 = 1.69680$ | $\nu_5 = 55.46$ |
| $r_8 = 57.285$ | | | | |
| | $d_8 = 2.88$ | | | |
| $r_9 = -50.391$ | | | | |
| | $d_9 = 1.50$ | | $n_6 = 1.69680$ | $\nu_6 = 55.46$ |
| $r_{10} = 176.105$ | | | | |
| | $d_{10} = $ variable | | | |
| $r_{11} = 51.821$ | | | | |
| | $d_{11} = 1.50$ | | $n_7 = 1.67270$ | $\nu_7 = 32.17$ |
| $r_{12} = 24.940$ | | | | |
| | $d_{12} = 5.20$ | | $n_8 = 1.51823$ | $\nu_8 = 58.96$ |
| $r_{13} = -101.940$ | | | | |
| | $d_{13} = $ variable | | | |
| $r_{14} = 48.054$ | | | | |
| | $d_{14} = 3.80$ | | $n_9 = 1.51633$ | $\nu_9 = 64.15$ |
| $r_{15} = 156.159$ | | | | |
| | $d_{15} = 0.10$ | | | |
| $r_{16} = 19.664$ | | | | |
| | $d_{16} = 4.30$ | | $n_{10} = 1.51633$ | $\nu_{10} = 64.15$ |
| $r_{17} = 31.396$ | | | | |
| | $d_{17} = 6.47$ | | | |
| $r_{18} = 154.692$ | | | | |
| | $d_{18} = 3.56$ | | $n_{11} = 1.75520$ | $\nu_{11} = 27.53$ |
| $r_{19} = 21.920$ | | | | |
| | $d_{19} = 4.88$ | | | |
| $r_{20} = 31.084$ | | | | |
| | $d_{20} = 4.84$ | | $n_{12} = 1.60717$ | $\nu_{12} = 40.36$ |
| $r_{21} = -27.453$ | | | | |
| | $d_{21} = 3.08$ | | | |
| $r_{22} = -19.659$ | | | | |
| | $d_{22} = 1.50$ | | $n_{13} = 1.63854$ | $\nu_{13} = 55.46$ |
| $r_{23} = -121.730$ | | | | | and variable separations are defined as follows:

| f | 71.4 | 102.449 | 147.0 |
|---|---|---|---|
| $d_5$ | 2.635 | 18.849 | 30.149 |
| $d_{10}$ | 25.177 | 15.535 | 1.701 |
| $d_{13}$ | 8.785 | 2.213 | 4.747 |

* * * * *